United States Patent
Toepke et al.

(10) Patent No.: US 7,411,582 B2
(45) Date of Patent: *Aug. 12, 2008

(54) SOFT INPUT PANEL SYSTEM AND METHOD

(75) Inventors: Michael G. Toepke, Bellevue, WA (US); Jeffrey R. Blum, Seattle, WA (US); Kathryn L. Parker, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,877

(22) Filed: Nov. 15, 2004

(65) Prior Publication Data

US 2005/0088421 A1    Apr. 28, 2005

Related U.S. Application Data

(63) Continuation of application No. 10/072,111, filed on Feb. 8, 2002, now Pat. No. 6,819,315.

(51) Int. Cl.
  *G06F 3/041* (2006.01)
(52) U.S. Cl. .................. 345/173; 345/179; 345/905; 715/825
(58) Field of Classification Search .......... 345/173, 345/179, 347, 762, 156, 901, 905, 87; 715/808, 715/825–829; 395/340
See application file for complete search history.

(56) References Cited

U.S. PATENT DOCUMENTS

| | | |
|---|---|---|
| 5,058,046 A | 10/1991 | Lapeyre |
| 5,128,672 A | 7/1992 | Kaehler |
| 5,252,951 A | 10/1993 | Tannenbaum et al. |

(Continued)

FOREIGN PATENT DOCUMENTS

EP    0464712    1/1992

(Continued)

OTHER PUBLICATIONS

"Function-independent Approach to Driving Soft Keyboards," IBM Technical Disclosure Bulletin, vol. 33, No. 4, pp. 159-161 (Sep. 1, 1990).

(Continued)

*Primary Examiner*—Richard Hjerpe
*Assistant Examiner*—Kimnhung Nguyen

(57) ABSTRACT

A method and system for receiving user input data into a computer system having a graphical windowing environment. A touch-sensitive display screen for displaying images and detecting user activity is provided. A management component connects to the graphical windowing environment to create an input panel window for display on the screen. An input method which may be a COM object is selected from multiple input methods available, and installed such that the input method can call functions of the management component. Each input method includes a corresponding input panel, such as a keyboard, which it draws in the input panel window. When the user taps the screen at the input panel, the input method calls a function of the management component to pass corresponding input information appropriate information such as a keystroke or character to the management component. In response, the management component communicates the user data to the graphical windowing environment as a message, whereby an application program receives the message as if the message was generated on a hardware input device.

31 Claims, 8 Drawing Sheets

U.S. PATENT DOCUMENTS

| | | |
|---|---|---|
| RE34,476 E | 12/1993 | Norwood |
| 5,276,794 A | 1/1994 | Lamb, Jr. |
| 5,517,578 A | 5/1996 | Altman et al. |
| 5,528,743 A | 6/1996 | Tou et al. |
| 5,574,482 A | 11/1996 | Niemeier |
| 5,596,702 A | 1/1997 | Stucka et al. ................. 395/40 |
| 5,644,339 A | 7/1997 | Mori et al. .................. 345/173 |
| 5,748,512 A | 5/1998 | Vargas |
| 5,760,773 A * | 6/1998 | Berman et al. .............. 715/808 |
| 5,777,605 A | 7/1998 | Yoshinobu et al. |
| 5,781,181 A | 7/1998 | Yanai et al. |
| 5,818,425 A | 10/1998 | Want et al. |
| 5,838,302 A | 11/1998 | Kuriyama et al. |
| 5,914,707 A * | 6/1999 | Kono .......................... 345/173 |
| 5,936,614 A | 8/1999 | An et al. |
| 5,956,423 A | 9/1999 | Frink et al. ................. 382/187 |
| 6,008,799 A | 12/1999 | Van Kleeck |
| 6,018,335 A | 1/2000 | Onley |
| 6,031,525 A | 2/2000 | Perlin |
| 6,069,628 A | 5/2000 | Farry et al. ................. 345/348 |
| 6,094,197 A | 7/2000 | Buxton et al. |
| 6,295,052 B1 | 9/2001 | Kato et al. |
| 6,819,315 B2 * | 11/2004 | Toepke et al. ............... 345/173 |

FOREIGN PATENT DOCUMENTS

| | | |
|---|---|---|
| JP | 01-191226 | 8/1989 |
| JP | 06-324806 | 11/1994 |
| JP | 08-22385 | 1/1996 |
| JP | 08-328805 | 12/1996 |
| WO | WO 9209944 | 6/1992 |

OTHER PUBLICATIONS

"Soft Adaptive Follow-Finger Keyboard for Touch-Screen Pads," IBM Technical Disclosure Bulletin, vol. 36, No. 11, pp. 5-7, (Nov. 1, 1993).

Kano, Nadine, *Developing International Software for Windows 95 and Windows NT,* Chapter 7, Appendix N and Appendix O, Microsoft Press, pp. 202-229, 553-556, 557-563.

International Search Report in Corresponding PCT Application No. PCT/US98/26683.

* cited by examiner

SOFT INPUT PANEL SYSTEM AND METHOD

CROSS-REFERENCE TOo RELATED APPLICATION

This is a continuation of U.S. patent application Ser. No. 10/072,111 filed Feb. 8, 2002, which is a continuation of U.S. patent application Ser. No. 08/991,277 filed Dec. 16, 1997.

FIELD OF THE INVENTION

The invention relates generally to computer systems, and more particularly to the input of data into a computer system.

BACKGROUND OF THE INVENTION

Small, mobile computing devices such as personal desktop assistants including hand-held and palm-top computers and the like are becoming important and popular user tools. In general, they are becoming small enough to be extremely convenient while consuming less and less battery power, and at the same time becoming capable of running more and more powerful applications.

Although such devices continue to shrink in size, size limitations are being reached as a result of human limitations. For example, a full character keyboard that enables user data input cannot be so small that human fingers cannot depress the individual keys thereon. As a result, the size of such devices (e.g., palm-top computers) has become limited to that which can accommodate a full character keyboard for an average user.

One solution to reducing the size of the portion of the device that receives user input is to provide a touch-sensitive display, and thereby substantially eliminate the need for a physical keyboard. To this end, an application program such as a word processor displays a keyboard, whereby the user enters characters by touching the screen at locations corresponding to the displayed keys. Of course, touch screen devices can also be used simultaneously with devices having a physical keyboard, whereby characters can also be entered by manually pressing the keys of the physical keyboard.

While a touch-screen device serves to provide a suitable means of user data entry, the data entry panel is typically part of the application program, i.e., each application needs to develop its own touch-sensitive interface. As a result, a substantial amount of duplication takes place. For example, both the word processor and a spreadsheet program require alphanumeric keyboard input, whereby each provides its own touch-screen keyboard interface. Other types of programs, such as a calculator program, need a numeric keypad with additional keys representing mathematical operations. This makes each program larger, more complex and consumes computer system resources.

Alternatively, the operating system can supply all the virtual keyboards and thus eliminate the redundancy, however this limits applications to using only those virtual keyboards supplied by the operating system. Newer applications (e.g., those added by plug-in modules) are unable to provide an input mechanism that is more tailored to its particular needs. For example, a new paintbrush program may need its own graphical input screen. In sum, there is a tradeoff between flexibility and efficiency that is inherent with present user data input mechanisms.

OBJECTS AND SUMMARY OF THE INVENTION

Accordingly, it is an object of the present invention to provide an improved method system for entering user data into a computer system.

Another object of the present invention is to provide the method and system for user data entry that is both efficient and flexible.

In accomplishing those objects, it is a related object to provide a method and system of the above kind that functions with touch-sensitive input mechanisms.

Yet another object is to provide a method and system as characterized above that enables a plurality of applications to receive user input from a common input method.

A related object is to provide a method and system that enables selection of one or more input methods for each application from among a set of interchangeable input methods.

Yet another object is to provide such a method and system that is cost-effective, reliable, extensible and simple to implement.

Briefly, the present invention provides a method and system for receiving user data input into a computer system, such as a computer system having a graphical windowing environment. The invention may utilize a touch-sensitive display screen for displaying images and detecting user contact therewith (or proximity thereto). A management component operatively connected to the graphical windowing environment creates an input panel window for display on the screen. An input method is selected from among a plurality of such input methods and installed, whereby the input method can call functions of the management component. Each input method includes a corresponding input panel, such as a keyboard, which it draws in the input panel window. When user data is received via the input panel, the input method calls a function of the management component to pass the user data thereto, and in response, the management component communicates the user data to the graphical windowing environment such as in a windows message. An application program receives the message, such as corresponding to a keystroke, as if the message was generated on a hardware keyboard.

Other objects and advantages will become apparent from the following detailed description when taken in conjunction with the drawings, in which:

DETAILED DESCRIPTION OF THE PREFERRED EMBODIMENT

Exemplary Operating Environment

Figure 1:
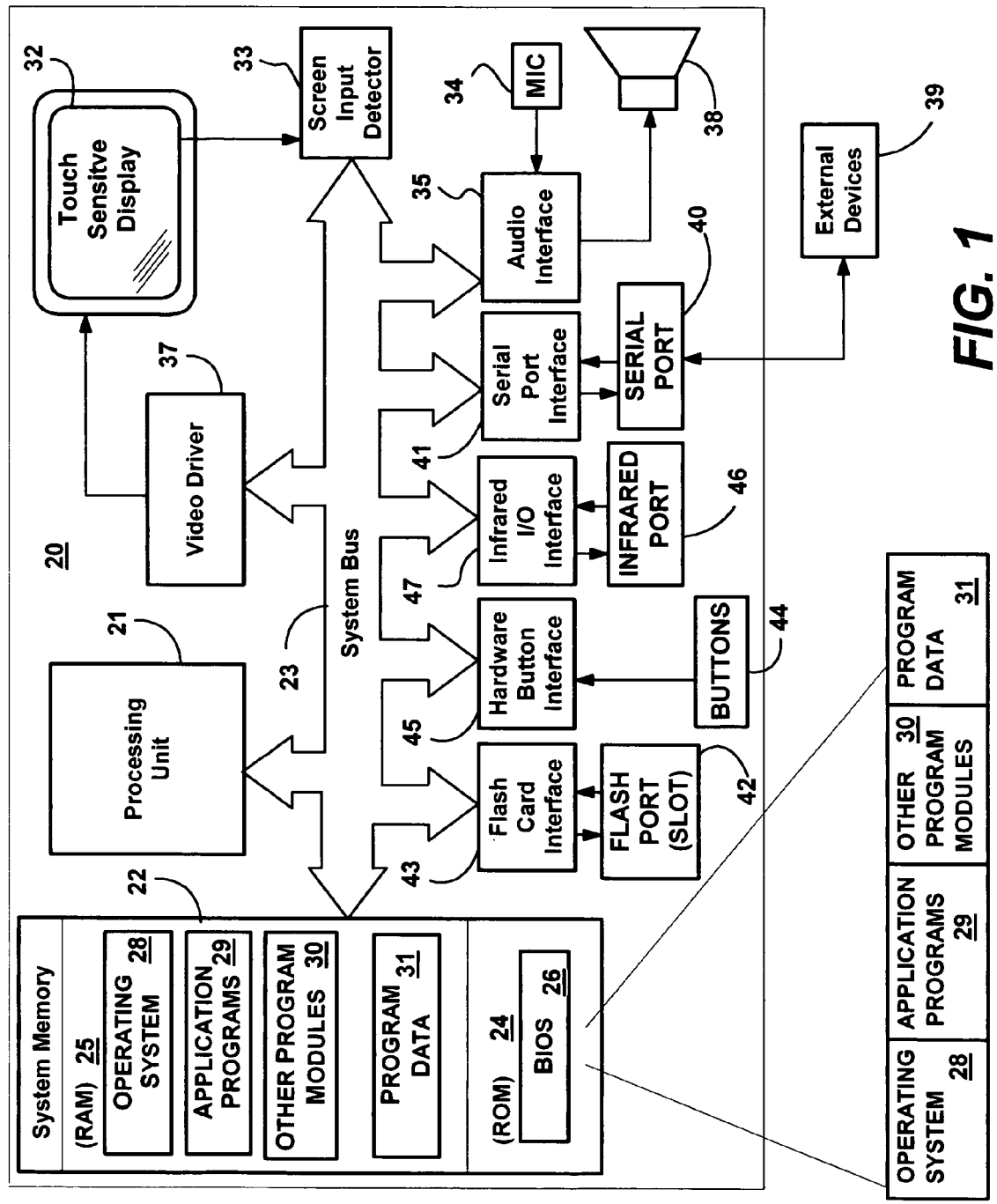
FIG. 1 is a block diagram representing a computer system into which the present invention may be incorporated.

FIG. 1 and the following discussion are intended to provide a brief, general description of a suitable computing environment in which the invention may be implemented. Although not required, the invention will be described in the general context of computer-executable instructions, such as program modules, being executed by a hand-held computing device such as a personal desktop assistant. Generally, program modules include routines, programs, objects, components, data structures and the like that perform particular tasks or implement particular abstract data types.

Moreover, those skilled in the art will appreciate that the invention may be practiced with other computer system configurations, including palm-top, desktop or laptop personal computers, mobile devices such as pagers and telephones, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a hand-held personal computing device 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the hand-held computer 20, such as during start-up, is stored in the ROM 24.

Figure 2:
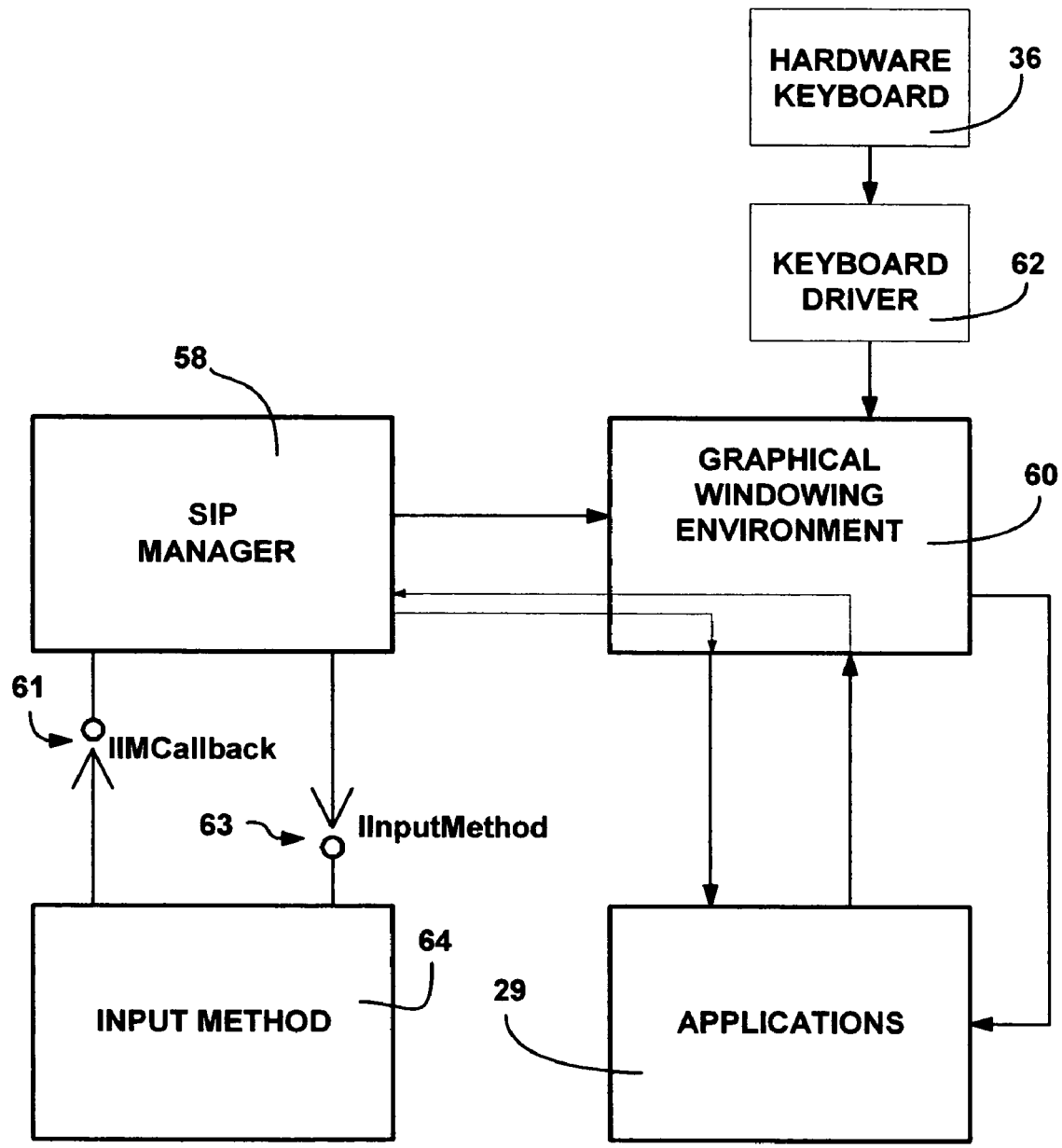
FIG. 2 is a block diagram representing various components and connections therebetween for implementing interchangeable input panels according to an aspect of the present invention.

A number of program modules are stored in the ROM 24 and/or RAM 25, including an operating system 28 (preferably Windows CE), one or more application programs 29, other program modules 30 and program data 31. A user may enter commands and information into the hand-held computer 20 through input devices such as a touch-sensitive display screen 32 with suitable input detection circuitry 33. Other input devices may include a microphone 34 connected through a suitable audio interface 35 and a physical (hardware) keyboard 36 (FIG. 2). The output circuitry of the touch-sensitive display 32 is also connected to the system bus 23 via video driving circuitry 37. In addition to the display 32, the device may include other peripheral output devices, such as at least one speaker 38 and printers (not shown).

Other external input or output devices 39 such as a joystick, game pad, satellite dish, scanner or the like may be connected to the processing unit 21 through an RS-232 or the like serial port 40 and serial port interface 41 that is coupled to the system bus 23, but may be connected by other interfaces, such as a parallel port, game port or universal serial bus (USB). The hand-held device 20 may further include or be capable of connecting to a flash card memory (not shown) through an appropriate connection port (e.g., slot) 42 and interface 43. A number of hardware buttons 44 such as switches, buttons (e.g., for switching application) and the like may be further provided to facilitate user operation of the device 20, and are also connected to the system via a suitable interface 45. An infrared port 46 and corresponding interface/driver 47 are provided to facilitate communication with other peripheral devices, including other computers, printers, and so on (not shown). It will be appreciated that the various components and connections shown are exemplary and other components and means of establishing communications links may be used.

Soft Input Panel

The soft input panel architecture is primarily designed to enable character, key-based and other user data input via the touch screen 32 of the device 20 rather than a physical keyboard 36. However, as can be appreciated, a given computer system 20 may optionally and additionally include a physical keyboard, as represented by the dashed box 36 of FIG. 2. Moreover, as will become apparent, the "soft input panel" need not be an actual touch-sensitive panel arranged for directly receiving input, but may alternatively operate via another input device such as the microphone 34. For example, spoken words may be received at the microphone 34, recognized, and displayed as text in an on-screen window, i.e., a soft input panel.

FIG. 2 shows a block diagram implementing the SIP architecture in accordance with one aspect of the present invention. The computer system 20 includes an operating system (OS) 28 such as the graphical windowing environment 60. Such a graphical windowing environment 60 is generally operational to receive user input through a variety of devices including the keyboard 36, a mouse (not shown), a digitizer (not shown) and so on. In turn, the graphical windowing environment 60 may provide such user input to an application having "input focus," typically in the form of a keyboard character event. Note that a number of applications 29 may be executable by the computer system, however one application that is currently running is said to have "input focus" and receive the input.

In accordance with one aspect of the present invention, the present architecture employs a SIP manager 58 to provide a single and flexible interface for a plurality of different input methods 64. In general, the SIP manager 58 provides keystrokes from a selected input method 64 to the graphical windowing environment 60 (e.g., the Windows CE operating system 28). Once received, the graphical windowing environment 60 sends information corresponding to the user input data to an application 29 (i.e., the application whose window currently has input focus) in the form of that keystroke, mouse or other message placed in the message queue of the application's window. The passing of such messages is well known in Windows programming and is described in "*Programming Windows 95*," Charles Petzold, Microsoft Press (1996), hereby incorporated by reference. As a result, any application capable of handling keyboard input may be used with any appropriately-configured input method 64. Indeed, if an optional keyboard 36 is present, keystrokes are directly provided by a keyboard driver 62 to the graphical windowing environment 60, whereby appropriate keystrokes are likewise placed in the message queue of the active application's window without the application being provided with information as to the source.

Input methods 64 may include, for example, various different displayable keyboards, (soft keyboards), a calculator, a formula and/or equation editor, chemical symbol template, voice recognition, handwriting recognition, shorthand symbol recognition (such as "Graffiti"), or other application-optimized input methods (e.g. a barcode reader). The SIP manager 58 provides a user interface for permitting a user to toggle a SIP window (panel) 50 (FIG. 7) between an opened and closed state, as described in more detail below. The SIP manager 58 also provides a user interface enabling user selection from a displayable list of available input methods. A user interacting with the user interface may select an input method 64, and in response, the SIP manager 58 loads and calls the selected input method 64. In a preferred embodiment, each of the input methods communicates with the SIP manager 58 through a COM (Component Object Model) interface shown as IIMCallback 61 and IInputmethod 63. A COM object comprises a data structure having encapsulated methods and data that are accessible through specifically defined interfaces. A detailed description of COM objects is provided in the reference entitled "Inside OLE," second edition, Kraig Brockschmidt (Microsoft Press), hereby incorporated by reference.

Generally, when the SIP window 50 is toggled between on/off by a user, as will be described in more detail below, the SIP manager 58 informs the selected input method 64 to correspondingly open/close the SIP window 50 through the IInputmethod mechanism 63. When a new input method is selected, the SIP manager 58, through the mechanism 63, informs any of the previously selected input methods to exit, and loads the newly selected input method. The mechanism 63 may also be utilized by the SIP manager 58 to obtain information specific to a selected input method, as also described in detail below.

The selected input method 64 may also communicate information to the SIP manager 58 via the IIMCallback mechanism 61, such as which character or characters were entered by a user, irrespective of whether the character or characters are generated through keyboard selection, handwriting recognition, voice recognition, a formula editor, calculator or the like. Such character input is generally passed to the SIP manager 58, preferably received as (or converted to) a Unicode character (for Windows CE) by the SIP manager 58 and output to the graphical windowing environment 60. Command key information, such as "Ctrl" on a keyboard, may also be provided by the input method 64 to the SIP manager 58 via interface 61.

SIP and input method-specific information may also be communicated through the SIP manager 58, and ultimately to the focused application 29, when the application is optimized for operating with a SIP (i.e., is "SIP-aware") as described in more detail below.

Figure 3:
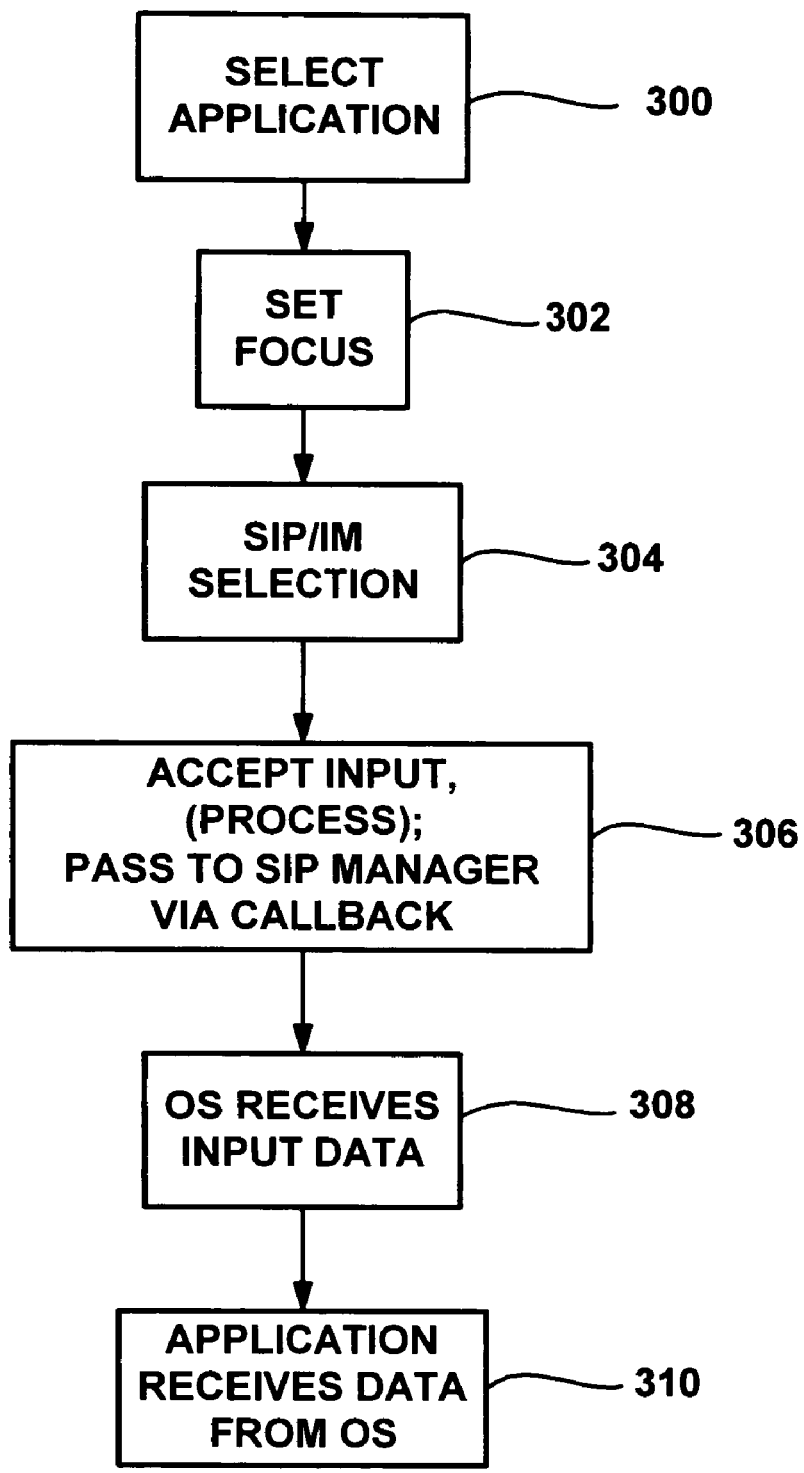
FIG. 3 is a flow diagram generally representing a process for getting user input from a selected input method to a selected application in accordance with one aspect of the present invention.

The system operates as generally represented in the steps of FIG. 3. Once an application is selected and has focus (steps 300-302), an input method 64 is selected therefor at step 304. Note that the input method 64 may be selected by the user, or a default input method may be selected for use with a particular application. Additionally, the input method 64 may be one that remains after having been selected for a previous application, i.e., a particular input method stays the same as the user switches between various applications. In any event, the input method 64 displays a SIP window 50 when selected.

As the user inputs data at step 306, appropriate data is passed to the SIP manager 58 via the IIMCallback mechanism 61, described below. Note that the input method 64 may first process the received data at step 306. By way of example, one particular input method 64 may convert barcode symbols to Unicode characters representing digits, another input method may convert mathematical entries into a Unicode result (e.g., an entry of '3+6=' sends a '9' to the SIP manager 58), while yet another may be an equation editor (e.g., the characters "Sqrt" are converted into a single Unicode value representing a square root symbol). After any such processing, the input method 64 passes those digits to the SIP manager 58, which in turn passes those digits to the graphical windowing environment 60. The application receives the character data from the graphical windowing environment 60 as if the user had entered those digits on a physical keyboard, regardless of the input method used.

Figure 4:
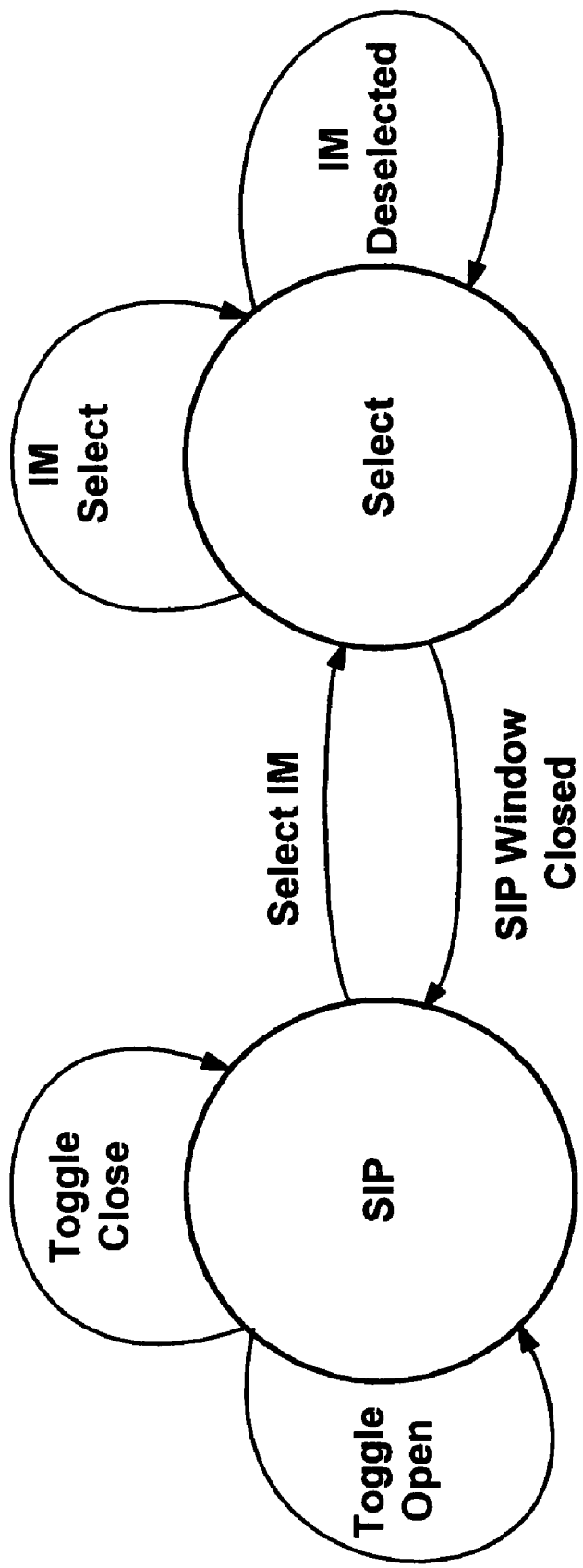
FIG. 4 is a state diagram generally representing SIP selection states.
Figure 5:
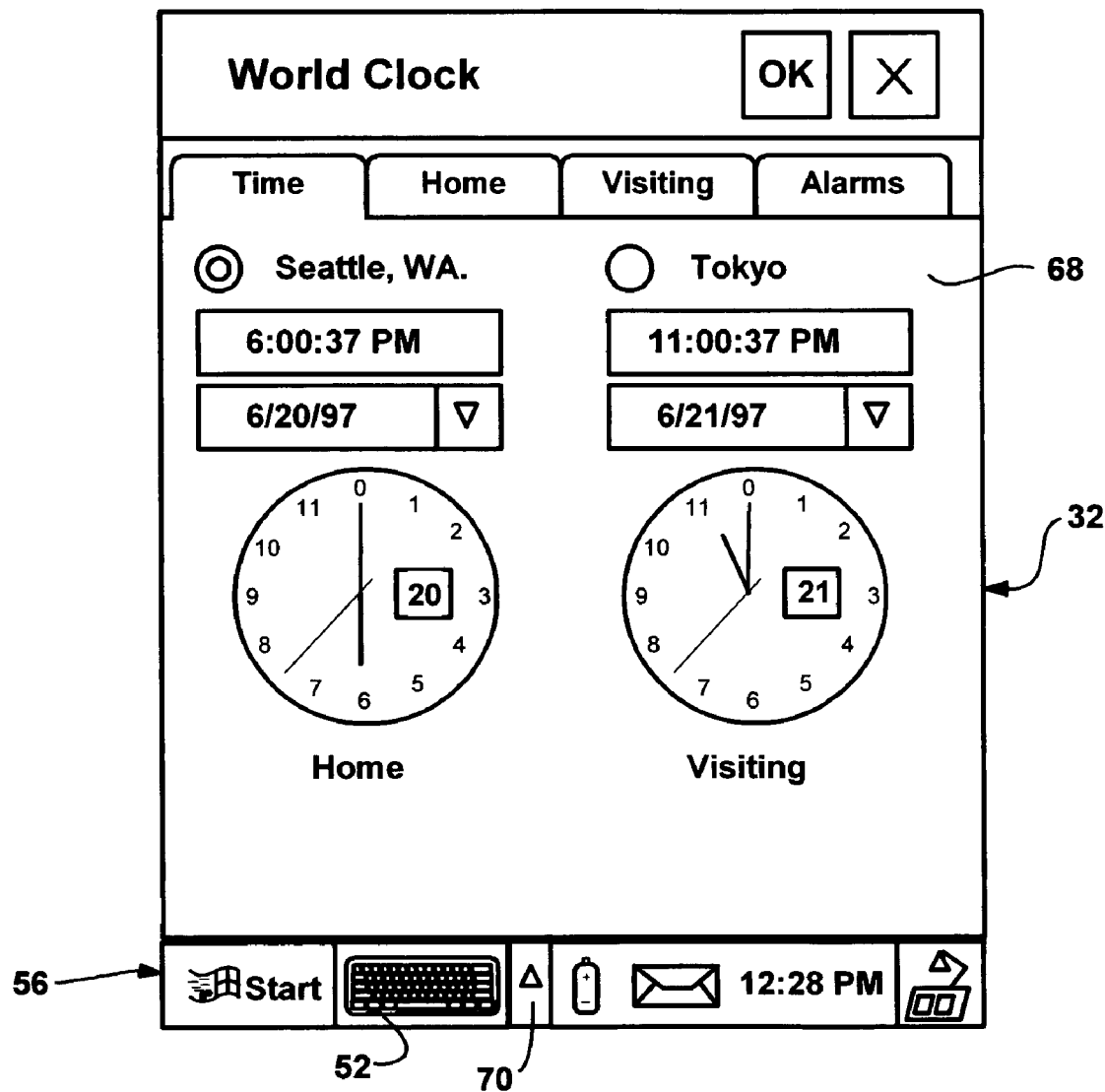
FIG. 5 represents a display on a touch-sensitive display screen on an exemplary computing device.
Figure 6:
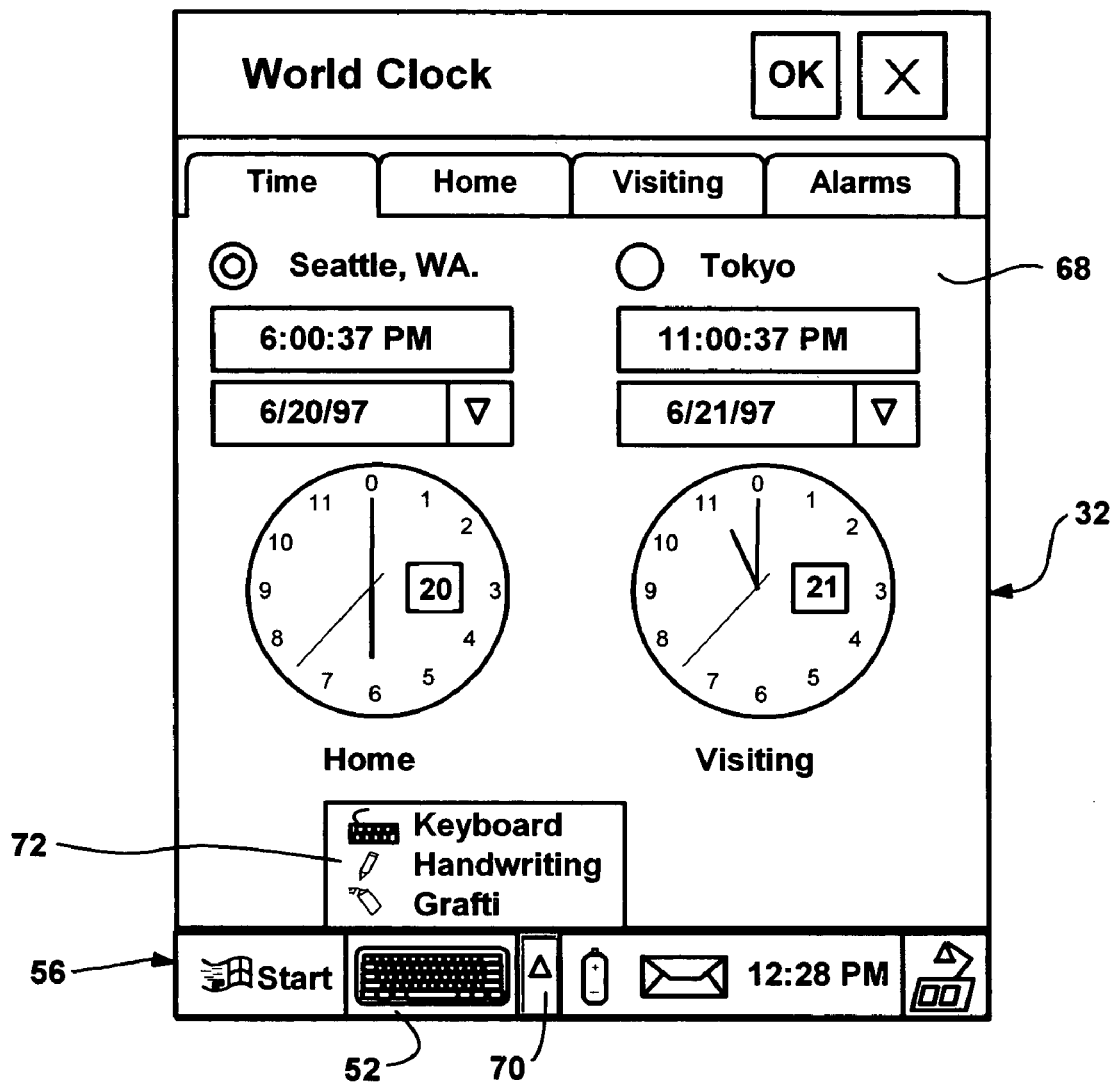
FIG. 6 represents a display on a touch-sensitive display screen on an exemplary computing device providing the ability to select from among interchangeable input panels in accordance with the present invention.
Figure 7:
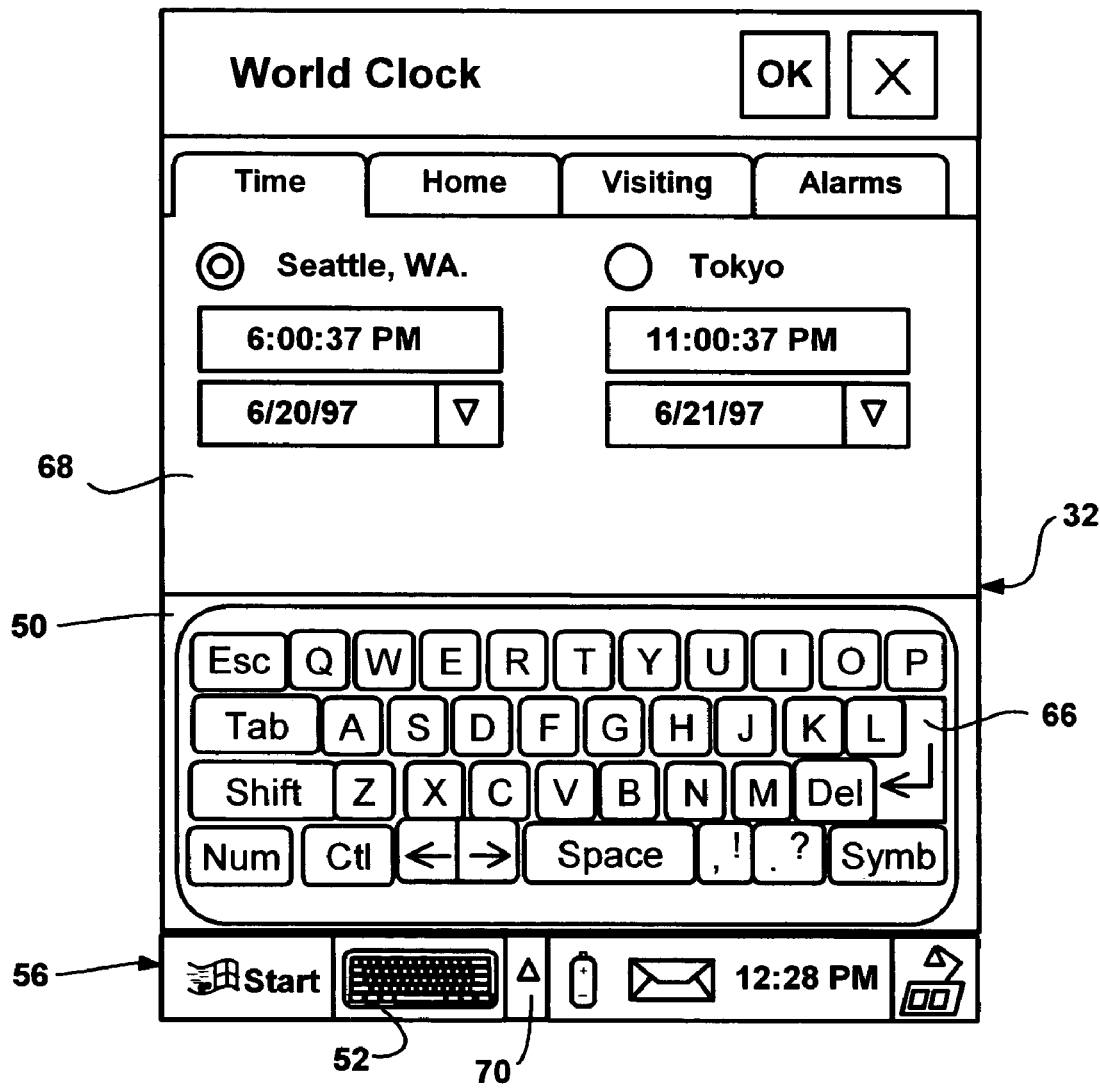
FIG. 7 represents a display on a touch-sensitive display screen wherein a keyboard has been selected as an input panel in accordance with the present invention.

As shown in FIGS. 5-7, the soft input panel (SIP) functionality of the system collectively includes the visible window 50 (FIG. 7), a visible SIP button 52, and various methods and functions (described below). As shown in FIG. 7, the SIP window 50 is a rectangular area provided by the input method 64 that can be hidden or shown at the user's (or an application program's) request. The visible SIP button 52 is located on a taskbar 56 or the like, and provides a touch-sensitive interface by which the user displays or hides the SIP window 50. Thus, as represented in the state diagram of FIG. 4, the window 50 toggles between an open, visible state (FIG. 7) and a closed, hidden state (FIG. 5) as the user taps the SIP button 52. A present design implements a 240 pixel wide by 80 pixel high SIP window 50 that is fixed (docked) on the display 32 at a position just above the taskbar 56. As will become apparent below, the soft input panel design supports other SIP window 50 sizes or positions.

To this end, the operating system 28 creates a dedicated thread (the SIP manager 58) that registers itself as a SIP thread with the Windows CE system. The thread creates the SIP window 50, performs other SIP initialization, and then enters a message loop to respond to messages and user interface activity in the SIP window 50. The thread also serves to dispatch messages to an Input Method's window, and calls into the Input Method 64 to permit the Input Method 64 to create windows that will respond as special SIP windows.

The SIP manager thread 58 is given special status by the system. For example, windows created by the SIP manager 58 thread are topmost windows, and ordinarily will not be obscured by other windows, except, e.g., when the taskbar 56 is activated in an auto-hide mode while the SIP window 50 is displayed. In this case, the SIP window 50 remains displayed in its current location and the taskbar 56 is displayed on top of the SIP window 50. More generally, any user interface element for controlling the SIP may (and should) be placed on top of (rather than underneath) the SIP window 50, whenever the controlling user interface element and the SIP window 50 overlap.

Moreover, when tapped on, the SIP window 50 (and any child windows thereof such as pushbuttons, text entry fields, scrollbars and the like) will not receive the input focus as would conventional program windows. In this manner, the user may interact with the SIP window 50 without changing the system focus. As can be appreciated, changing the system focus each time the user inputs data into the SIP window 50 would be undesirable. The SIP button 52 will also not cause a change of focus for the same reason, i.e., it is undesirable to cause the window with focus to lose focus by tapping on the SIP button 52 to bring out the SIP window 50.

In accordance with one aspect of the present invention, the SIP system enables the selective installation of a specified Input Method 64. As generally described above, each Input Method 64 is an interchangeable component by which the user provides character, text or other user data via the touch-screen display (or some other input device). More particularly, the SIP manager 58 preferably exposes a COM interface that enables the selective installation of Input Methods 64. The Input Method 64 occupies space inside a SIP window 50 created by the system.

Preferably, the Input Method 64 comprises a Component Object Model (COM) object that implements the IInputMethod interface. Notwithstanding, the Input Method 64 and SIP manager 58 can comprise virtually any components capable of communicating with one other through some mechanism, such as by receiving, responding to, and making function calls.

The Input Method 64 is responsible for drawing in the SIP window 50 and responding to user input in the SIP window 50. Typically, the Input Method 64 will respond to user input and convert that input into characters which are then sent to the SIP manager 58 via exposed SIP functions. By way of example, one Input Method 64 includes a default QWERTY (alpha) keyboard 66 shown in FIG. 7. More particularly, this Input Method 64 displays an image of the keyboard 66 on the screen 32, and converts taps on that keyboard 66 (detected as screen coordinates) into characters which are sent to the SIP manager 58 and thereby to the system. Input Methods may be written by application vendors, and are added to the system using COM component installation procedures.

The user interacts with the Input Method 64 manifested in the visible SIP window 50 to create system input. As best represented by the state diagram of FIG. 4 and as shown in FIG. 6, the user can select a different Input Method by tapping a SIP menu button 70 on the taskbar 56 that provides a pop-up input method list 72 into the SIP window 50. The user can also select among available Input Methods via a control panel applet (not shown) or the like. The SIP control panel applets communicate with the operating system 28 using the registry and the exposed SIP-aware functionality described below.

As will be described in detail below, the various components cooperate to expose functions, structures, and window messages that enable system applications 29 to respond to changes in the SIP state. An application 29 that uses this functionality to adjust itself appropriately to SIP changes is considered "SIP-aware." Other applications may be SIP-aware yet choose to retain their original size (and thus be partially obscured by the SIP window 50) when appropriate. Moreover, and as also described below, there are exposed functions that enable applications to programmatically alter the SIP state.

Notwithstanding, applications 29 need not be aware of the SIP system in order to benefit from the present invention. Indeed, one aspect of the present invention is that applications do not ordinarily recognize whether data received thereby originated at a hardware input device such as the keyboard 36 or via user activity (e.g., contact or proximity detected by the screen 32 and detection circuitry 33) within the soft input panel window 50. This enables applications to operate with virtually any appropriate input method, irrespective of whether that application is SIP-aware.

Turning to an explanation of the mechanism that facilitates the operation of an Input Method 64 installed by the SIP manager 58, a SIP-aware application 29 is notified when the SIP window 50 changes state and what the new, current state of the SIP window 50 is. The state includes whether the status of the SIP window 50 is visible or hidden, whether the SIP window 50 is docked or in a floating condition, and the size and position of the SIP window 50. As shown in the table below, a data structure (SIPINFO) contains this SIP information:

```
Typedef struct {
    DWORD   cbSize
    DWORD   fdwFlags
    RECT    rcVisibleDesktop
    RECT    rcSipRect
    DWORD   dwImDataSize
    Void    *pvImData
} SIPINFO;
```

The cbSize field may be filled in by the application program 29 and indicates the size of the SIPINFO structure. This field allows for future enhancements while still maintaining backward compatibility, and indeed, the size of the SIPINFO structure may be used to indicate the version to the components of the system. The fdwFlags field represents the state information of the SIP window 50, and can be a combination of three flags. A SIPF_ON flag that is set indicates that the SIP window 50 is visible (i.e., not hidden), while a set SIPF_DOC flag indicates the SIP window 50 is docked (i.e. not floating). A set SIPF_LOCKED flag indicates that the SIP window 50 is locked, i.e., the user cannot change its visible or hidden status. Note that a given implementation may not allow floating or locked SIP windows, however the capability is present within the system.

The rcVisibleDesktop field contains a rectangle, in screen coordinates, representing the area of the screen desktop 68 not obscured by the SIP window 50. If the SIP window 50 is floating (not docked), this rectangle is equivalent to the user-working area. Full-screen applications wishing to respond to SIP window 50 size changes can generally set their window rectangle data structure ("rect") values to this RECT data structure's values. If the SIP window 50 is docked and does not occupy an entire edge (top, bottom, left or right), then this rectangle represents the largest rectangle not obscured by the SIP window 50. However, the system may provide available desktop space 68 not included in the RECT data structure.

Next, the rcSipRect field contains the rectangle, in screen coordinates, representing the size and location of the SIP Window 50. Applications 29 will generally not use this information, unless an application 29 wants to wrap around a floating SIP window 50 or a docked SIP window 50 that is not occupying an entire edge.

The dwImDataSize field contains the size of the data pointed to by the PvImData member, which is the next field, i.e., a pointer to the Input Method-specific data. The data are defined by the Input Method 64.

Figure 8:
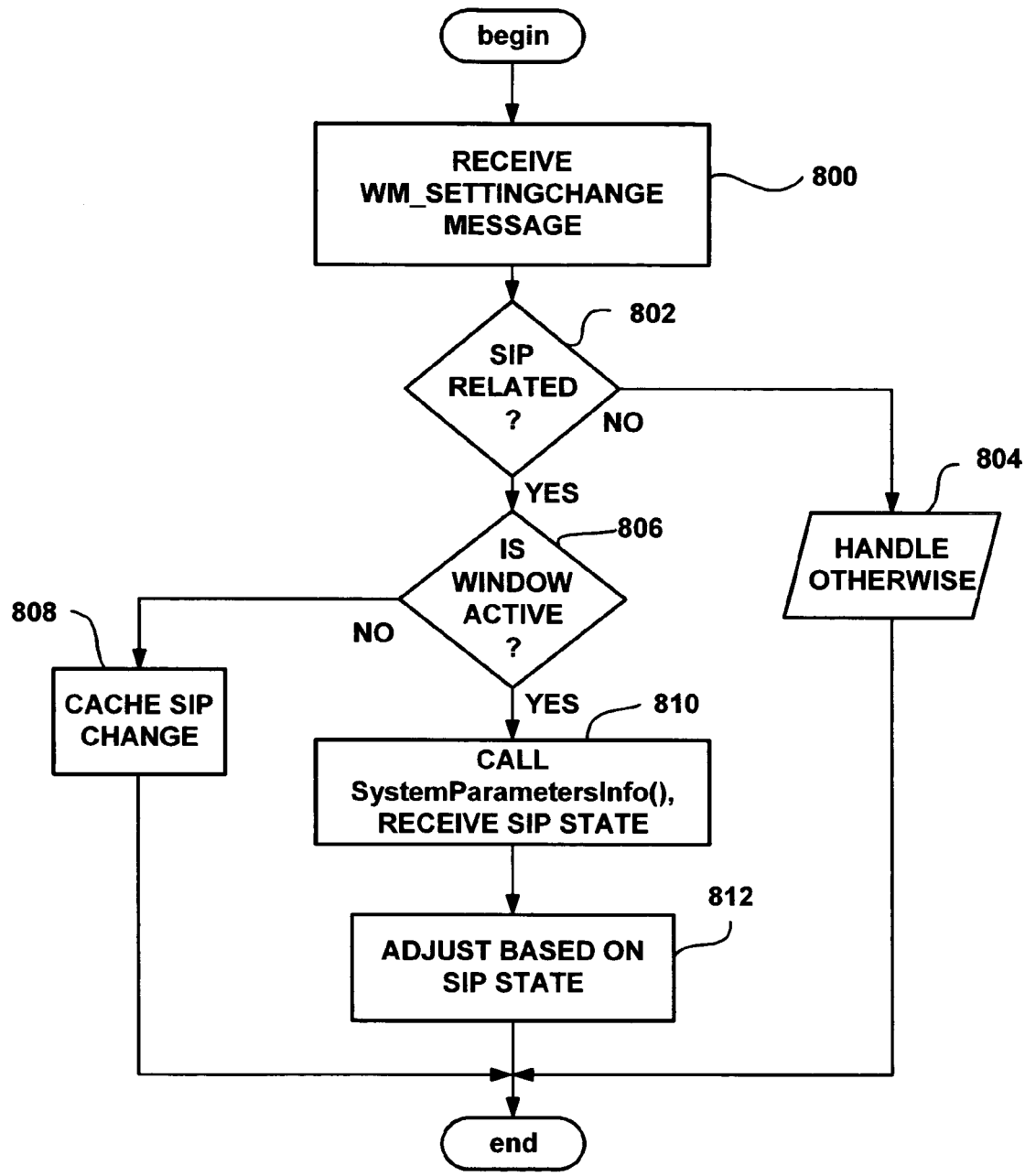
FIG. 8 is a flow diagram representing the general steps taken in response to a change in SIP status.

Whenever the state of the SIP window 50 changes, i.e., a new Input Method has been selected and/or a visibility, docking or size change has occurred, a message, WM_SETTINGCHANGE, is sent to all top-level windows, as generally represented at step 800 of FIG. 8. In this manner, an application 29 can adjust itself to the new state of the SIP window 50, such as by adjusting its size in response to this message. To this end, a flag, SPI_SETSIPINFO, is sent with this message to indicate when SIP information has changed, and another flag, SPI_SETCURRENTIM, when the current Input Method has changed. As shown at step 802 of FIG. 8, the flag is tested to determine if the message is SIP-related or another type of setting change message (whereby it is handled at step 804). If SIP-related, for performance reasons, the applications that are not currently active in the foreground cache these SIP changes (steps 806-808). If the application's window is active, the application can adjust its size and/or window (steps 810-812). For example, as shown in FIGS. 5 and 6, when the SIP window 50 of FIG. 7 is hidden and an active application 29 notified, the application 29 may use the additional desktop space 68 to display more information such as the analog clock faces. Note that an application 29 that has cached a SIP change when inactive can query the current SIP state when activated to subsequently adjust itself in an appropriate manner in accordance with the information that is returned.

To query the SIP manager 58, another function, SHSipInfo, is provided so that applications 29 can determine information about the SIP window 50 and Input Method 64. In general, if this function succeeds, the return value will be nonzero, while if this function fails, the return value will equal zero and extended error information will be available via a GetLastError( ) call.

The following table sets forth the structure of this call:

```
SHSipInfo (
    UINT uiAction
    UINT uiParam
    PVOID pvParam
    UINT fwinIni
);
```

The uiAction parameter can include the values SIP_SETSIPINFO, SPI_GETSIPINFO, SPI_SETCURRENTIM and SPI_GETCURRENTIM. SIP_SETSIPINFO indicates that pvParam points to a SIPINFO structure (described above). The cbsize, dwImDataSize and pvImDataSize are filled in before calling the SHSipInfo function. In response to this call, the SIPINFO structure is filled in with the current SIP size, state, and visible desktop rectangle. If both dWImDataSize and pvImData are nonzero, the data size and pointer are sent to the Input Method 64. If the Input Method 64 is called but does not provide Input Method-specific data, or the format or size of the data passed in is not in a format recognized by the Input Method 64, then the SHSipInfo function call fails (returns zero). If the size and format are supported by the Input Method 64, the Input Method 64 fills in the buffer that is pointed to by pvImData with the Input Method-specific data. Typically, an application 29 will set the pvImDataSize to zero and pvImData to NULL.

A uiAction of SPI_SETSIPINFO indicates that pvParam points to a SIPINFO structure. The SIP window 50 size and state are set to the values specified in the SIPINFO structure. Before changing a SIP value, the application 29 should first obtain the current SIP state by calling SHSipInfo with SPI_GETSIPINFO, then change whatever specific SIP state values it wishes to change before making the SPI_SETSIPINFO call. The cbSize field is set to the size of the SIP in the structure, and if both pvImDataSize and pvImData are not zero, the data size and pointer are sent to the Input Method 64. The SHSipInfo call fails if the Input Method 64 is called and does not allow setting Input Method-specific data, or if the format or size of the passed data is not in a format recognized thereby. If a size and format are supported by the Input Method 64, the Input Method 64 uses the data to set Input Method-specific information. Typically, an application will set the pvImDataSize to zero and pvImData to NULL.

SPI_SETCURRENTIM indicates that pvParam points to a CLSID structure which specifies the CLSID of the Input Method 64 to which the SIP will switch. If the CLSID is not valid, or if the specified Input Method 64 cannot be loaded, the call fails (return value equals zero) and a default Input Method 64 (e.g., the QWERTY-like keyboard 66) is loaded.

Lastly, a uiAction of SPI_GETCURRENTIM indicates that pvParam points to a CLSID structure that receives the CLSID of the currently selected Input Method 64.

The IInputMethod Interface

IInputMethod is the interface implemented by the Input Method 64 components. The SIP manager 58 calls the methods of this interface to notify the Input Method 64 of state changes, and request action and information from the Input Method 64. In general, if the called method succeeds, a success is returned, and conversely, if the method fails, a failure result is returned. The following table sets forth the method calls available in this IInputMethod interface:

```
Interface IinputMethod : Iunknown
{
    HRESULT Select ( [in] HWND hwndSip );
    HRESULT Deselect( void );
    HRESULT Showing ( void );
    HRESULT Hiding ( void );
    HRESULT GetInfo ( [out] IMINFO *pimi );
    HRESULT ReceiveSipInfo ( [in] SIPINFO *psi );
    HRESULT RegisterCallback ( [in] IIMCallback* pIMCallback );
    HRESULT GetImData ( [in] DWORD dwSize, [out] LPVOID
        pvImData );
    HRESULT SetImData ( [in] DWORD dwSize, [in] LPVOID
        pvImData );
    HRESULT UserOptionsDlg ( [in] HWND hwndParent );
}
```

An Input Method 64 will ordinarily receive a Select( ), GetInfo( ), ReceiveSipInfo( ) and Register Callback( ) method call, in sequence, before rendering the SIP window 50 space or responding to user actions. When the SIP window 50 is displayed (i.e., turned on), Showing( ) will be called by the SIP manager 58, after which the Input Method 64 issues a WM_PAINT message to render the SIP window 50.

The Select( ) method is called when the Input Method 64 has been selected into the SIP. The Input Method 64 generally performs any desired initialization in response to this call. The Input Method is responsible for drawing the entire client area of the SIP window 50, and thus ordinarily creates its windows and imagelists (collections of displayable bitmaps such as customized icons) in response to this call. For example, the window handle of the SIP window 50 is provided to the Input Method 64 as a parameter accompanying this Select( ) method call, and the Input Method normally creates a child window of this SIP window 50. The Input Method 64 is also provided with a pointer to a value, which is set to nonzero by the Input Method 64 if the method call is successful or zero if not successful.

The Deselect( ) method is called when the Input Method 64 has been selected out of the SIP. The Input Method's window should be destroyed in response to this call, and the Input Method 64 will typically perform any other cleanup at this time.

The Showing( ) method will cause the SIP window 50 to be shown upon return from the call. Note that the SIP window 50 is not visible prior to this call, and that once the SIP window 50 is shown, this window and its children will receive paint messages. Conversely, the Hiding( ) method hides the SIP window 50 upon return from the call. Accordingly, the Showing( ) and Hiding( ) methods are used to toggle the SIP window 50 between its open and closed states.

The GetInfo( ) method is called when the system is requesting information about the Input Method 64. The information requested includes flags indicating any special properties of the Input Method 64, the handles of two imagelists which contain masked bitmaps that are to be displayed on the SIP button 52 when that Input Method 64 is active, indices into the specified imagelists, and a rectangle indicating the preferred size and placement of the Input Method 64. The call includes a parameter, pimi, which is a pointer to a data structure (IMINFO) that the Input Method 64 should fill in with appropriate data. The call also provides a pointer to a value that the Input Method should set to nonzero to indicate success and zero to indicate failure. More particularly, the IMINFO data structure is represented in the following table:

```
Typedef struct {
    DWORD cbSize;
    HIMAGELIST hImageNarrow;
    HIMAGELIST hImageWide;
    Int iNarrow;
    Int iWide;
    DWORD fdwFlags;
    Rect rcSipRect;
} IMINFO;
```

The cbSize field contains the size of the IMINFO structure, and is filled in by the SIP manager 58 prior to calling calling GetInfo( ). The hImageNarrow field is a handle to an imagelist containing narrow (16×16) masked bitmaps for the Input Method 64. Similarly, hImageWide is a handle to the imagelist containing wide (32×16) masked bitmaps. The SIP manager 58 displays one of the bitmaps (e.g., on the taskbar 56) to indicate the Input Method 64 that is currently selected. Note that the SIP manager 58 may use the 16×16 or 32×16 bitmaps at various times depending on how it wishes to display the bitmap.

The iNarrow field is an index into the hImageNarrow imagelist indicating which bitmap of several possible from that (narrow) imagelist should currently be displayed. Similarly, the iwide field is an index into the hImageWide imagelist indicating which bitmap from that (wide) image list should currently be displayed. Note that the Input Method 64 can initiate a change of the bitmap displayed in the SIP taskbar button 52 by calling IIMCallback::SetImages (described below).

The fdwFlags field indicates the visible, docked and locked states (SIPF_ON SIPF_DOCKED and SIPF_LOCKED) of the Input Method 64, as well as any special Input Method flags that may be defined in the future. Note that the SIP state flags are ignored for the GetInfo( ) method, but are used in the SetImInfo callback method as described below.

Lastly, the rcSipRect field describes the size and placement of the SIP rectangle. The sizing and placement information returned from GetInfo( ) may be used by the SIP when determining an initial default size and placement. When used, the SetImInfo callback method (described below) specifies the new size and placement of the SIP window 50.

The ReceiveSipInfo( ) method provides information to the Input Method 64 about the SIP window, including the current size, placement and docked status thereof. This call is made whenever the user, an application 29 or the Input Method 64 changes the SIP state. When the SIP manager 58 sends this information during Input Method initialization, the SIP manager 58 is informing the Input Method 64 of the default SIP settings. The Input Method 64 can choose to ignore these defaults, however the values given are ones that either the user has selected or values that have been recommended as expected or accepted SIP values for that platform. A pointer to the SIPINFO structure that includes this information is passed with this call.

The RegisterCallback method is provided by the SIP manager 58 to pass a callback interface pointer to the Input Method 64. In other words, the RegisterCallback method call passes an IIMCallback interface pointer as a parameter to the Input Method 64, whereby the Input Method 64 can call methods on this interface to send information back to the SIP manager 58 as described below. The Input Method 64 uses the callback interface pointer to send keystrokes to applications 29 via the SIP manager 58 and to change its SIP taskbar button icons 52.

The GetImData( ) method is called when an application program 29 has asked the SIP for the SIPINFOdata structure and has provided a non-NULL pointer for the pvImData member of the SIPINFO structure. The application 29 will ordinarily cause this call to be made when requesting some special information from the Input Method 64. Two parameters are passed with this call, dwsize, the size of the buffer pointed to by pvImData, and pvImData, a void pointer to a block of data in the application 29.

With this call, the application 29 is essentially requesting that the Input Method 64 fill the block with information, wherein the size and format of the data are defined by the Input Method 64. This call is designed for Input Methods 64 that wish to provide enhanced functionality or information to applications. By way of example, a SIP-aware application may wish to know whether a character was entered by way of the SIP or by some other means. An input method 64 can thus respond to the application's request by filling the block.

The SetImData( ) method is called when an application 29 has set the SIPINFO data structure and has provided a non-NULL pointer for the pvImData member of the SIPINFO structure. The application 29 will ordinarily cause this call to be made when requesting that the Input Method 64 set some data therein. The parameters passed with this call include dwsize, the size of the buffer pointed to by pvImData, and pvImData, a void pointer to a block of data in the application 64.

The IIMCallback Interface

The Input Method 64 uses the IIMCallback interface to call methods in the SIP manager 58, primarily to send keystrokes to the current application or to change the icon that the taskbar 56 is displaying in the SIP button 52. The Input Method 64 ordinarily calls the IIMCallback methods only in response to a call thereto which was received through an IInputMethod method call. In general, if the function succeeds, the return value will be a success HRESULT, while conversely, if the function fails, the return value is a failure HRESULT.

The following table represents the IIMCallback Interface:

```
Interface IIMCallback :
Iunknown
{
    Hresult SetImInfo(
            IMINFO *pimi );
    Hresult SendVirtualKey (
            BYTE bVk,
            DWORD dwFlags );
    Hresult SendCharEvents(
            UINT uVk,
            UINT uKeyFlags,
            UINT uChars,
            UINT *puShift,
            UINT *puChars );
    Hresult SendString(
            BSTR ptrzStr,
            DWORD dwChars );
}
```

The first callback, SetImInfo( ) is called by the Input Method 64 to change the bitmaps shown on the SIP taskbar button 52 representing the current SIP, or to change the visible/hidden state of the SIP window 50. It is also sent by the Input Method 64 to the SIP manager 58 as a notification when the Input Method 64 has changed the size, placement or docked status of the SIP window 50. By this mechanism, the various Input Methods 64 are able to alert the SIP manager 58 to these two types of changes so that the two remain synchronized. By way of example, an Input Method 64 may wish to have a user interface element which allows the user to toggle between a docked state and a floating state, or between one or more subpanels (e.g. keyboard with buttons to switch to a number and/or symbol panel or international symbol panel). The Input Method 64 uses this call to inform the SIP manager 58 of each change in state.

Although not necessary to the invention, all values passed in the IMINFO structure are used by the SIP manager 58. Consequently, the Input Method 64 should first determine the current state of the SIP window 50 as provided by the SIP manager 58 in the SIPINFO structure received via a prior ReceiveSipInfo( ) method call, described above. Then, the Input Method 64 should make changes to only those settings in which a change is desired, and pass a full set of values back in the IMINFO structure. The pimi parameter is sent as a pointer to an IMINFO structure representing the new Input Method 64 settings, including the size, placement and state of the SIP window 50 as well as the desired Input Method 64 images.

In response to the SetImInfo( ) call, the SIP manager 58 will show or hide the SIP window 50 as specified in the fdwFlags of the IMINFO structure. However, the SIP manager 58 will not resize or move the SIP window 50 if requested, but will instead update the size and placement information returned to applications 29 when queried. If the specified values represent a change from the current SIP state, the SIP manager 58 will notify applications 29 that the SIP state has changed via a WM_SETTINGCHANGE message, described above.

The SendVirtualKey( ) callback is used by an Input Method 64 to simulate a keystroke for a virtual key, e.g., a character or the like entered via the touch screen display 32 or some other Input Method 64. The key event will be sent to the window which currently has focus (i.e., the window which would have received keyboard input had a key been pressed on an external keyboard). The SendVirtualKey callback modifies the global key state for the virtual key sent, whereby, for example, an Input Method 64 can use this function to send SHIFT, CONTROL, and ALT key-up and key-down events, which will be retrieved correctly when the application 29 calls the GetKeyState( ) API. The SendVirtualKey callback should be used to send virtual key events that do not have associated characters (i.e., keys that do not cause a WM_CHAR sent as a result of TranslateMessage. Note that WM_CHAR, TranslateMessage and other key-related messages are described in the reference "Programming Windows 95", Charles Petzold, supra). If character-producing virtual keys are sent via this function, they will be modified by the global key state. For example, a virtual key of VK__5 that is sent when the shift state is down will result in a '%' WM_CHAR message for certain keyboard layouts.

Parameters sent with this callback include bVk, which is the virtual keycode of the key to simulate, and dwFlags. The dwFlags may be a combination of a SIPKEY_KEYUP flag, (used to generate either a WM_KEYUP or WM_KEYDOWN), a SIPKEY_SILENT flag, (the key press will not make a keyboard click even if clicks are enabled on the device), or zero.

The SendCharEvent callback allows an Input Method 64 to send Unicode characters to the window having focus, while also determining what WM_KEYDOWN and WM_KEYUP messages the application 29 should receive. This allows the Input Method 64 to determine its own keyboard layout, as it can associate any virtual key with any characters and key state. In keeping with one aspect of the invention, applications 29 thus see keys as if they were sent from a keyboard (i.e., they get WM_KEYDOWN, WM_CHAR, and WM_KEYUP messages). Thus, unlike the SendVirtualKey( ) function, this function does not affect the global key state. By way of example, with the SendCharEvent callback, the Input Method 64 can determine that the shifted (virtual key) VK_C actually sent the Unicode character 0x5564. The shift state flag (specified in the puShift parameter, described below) that is associated with the first character to be sent determines whether a WM_KEYDOWN or WM_KEYUP is generated.

Parameters include uVk, the virtual keycode sent in the WM_KEYUP or WM_KEYDOWN message generated as a result of this function, and a uKeyFlags parameter, a set of KEY state flags that are translated into the lKEYData parameter received in the WM_CHAR, WM_KEYUP or WM_KEYDOWN messages received by the application 29 as a result of this call. Only the KeyStateDownFlag, KeyStatePrevDownFlag, and KeyStateAnyAltFlag key state flags are translated into the resulting lKeyData parameter. The uChars parameter represents the number of characters corresponding to this key event, while the puShift parameter is a pointer to a buffer containing the corresponding KEY_STATE_FLAGS for each character to be sent. If the KeyStateDownFlag bit is sent, this function generates a WM_KEYDOWN message, otherwise it generates a WM_KEYUP message. Lastly, the puchars parameter is a pointer to a buffer containing the characters to be sent.

An Input Method 64 may use the SendString callback to send an entire string to the window which currently has the focus, whereby a series of WM_CHAR messages are posted to the application 29. An Input Method 64 would typically use this callback after it has determined an entire word or sentence has been entered. For example, a handwriting recognizer or speech recognizer Input Method 64 will use the SendString callback after it has determined that a full word or sentence has been entered.

Parameters of the SendString callback include ptszStr, a pointer to a string buffer containing the string to send, and dwSize, the number of characters to send. This number does not include the null-terminator, which will not be sent.

As can be seen from the foregoing detailed description, there is provided an improved method system for entering user data into a computer system. The method and system are both efficient and flexible, and function with touch-sensitive input mechanisms. With the system and method, a plurality of applications can receive user input from a common input method, while interchangeable input methods may be selected from among a set thereof for each application. The method and system are cost-effective, reliable, extensible and simple to implement.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. In a computing environment, a computer-implemented method comprising:
 displaying an actuatable icon representative of an input method list that includes one or more selectable input methods for one or more computer programs, wherein each input method is a computer-executable software component distinct from the computer programs;
 in response to actuation of the actuatable icon, displaying the input method list;
 receiving a selection of an input method from the input method list;
 installing an input method component that corresponds to the selected input method, the input method component causing an interactive input panel to be displayed;
 receiving input via the interactive input panel; and
 providing the input to a computer program of the one or more computer programs as if the information was received via user input received from a hardware input device.

2. The method of claim 1 wherein providing the input to the computer program comprises communicating information representative of the input to a graphical windowing environment.

3. The method of claim 2 wherein communicating the information comprises passing the information to an interface.

4. The method of claim 2 further comprising, communicating the information from the graphical windowing environment to an application program, wherein the computer program includes the application program, wherein the information is provided to the application program in a same manner as if the input was received via a hardware keyboard.

5. The method of claim 2 wherein providing the input to the computer program comprises placing the information, by the graphical windowing environment, in a message in a message queue of the computer program, wherein the message queue capable to receive messages corresponding to input from the selected input method and messages corresponding to input from a hardware input device.

6. The method of claim 1 wherein the selected input method corresponds to a displayed keyboard, and wherein receiving input via the interactive input panel that corresponds to the selected input method comprises receiving information corresponding to a keyboard character entered via the displayed keyboard.

7. The method of claim 1 wherein the selected input method corresponds to a handwriting input area, and wherein receiving input via the interactive input panel that corresponds to the selected input method comprises receiving information corresponding to handwritten data.

8. The method of claim 1 further comprising, hiding the input panel.

9. The method of claim 1 further comprising, docking the input panel.

10. At least one computer-readable medium having computer-executable instructions, which when executed perform the method of claim 1.

11. At least one computer-readable medium having computer-executable instructions stored thereon, which when executed by a computer system perform steps, comprising:
 selecting one of a plurality of executable input methods for supplying user input to the computer system, wherein each executable input method is an interchangeable software component distinct from one or more application programs, each executable input method having a defined interface set such that the executable input method is connectable to the application programs;
 opening an input window on a display of the computer system independent of a window of an active application program; and
 displaying an interactive input panel in the input window, the interactive input panel corresponding to the selected executable input method such that information corresponding to user input received by the selected executable input method via the interactive input panel is provided to the active application program as if the information was received via user input at a hardware input device.

12. The computer-readable medium of claim 11 further comprising, providing an input panel button on the display of the computer system, the input panel button being responsive to open and to close the input window.

13. The computer-readable medium of claim 11 further comprising, providing a Software Input Panel (SIP) menu button on the display of the computer system, the SIP menu button being actuatable to display a selectable list of the plurality of executable input methods.

14. The computer-readable medium of claim 13 further comprising, receiving a selection of one of the plurality of executable input methods displayed in the list as a selected executable input method, and in response, closing any open input window, and opening a new input window corresponding to the selected executable input method.

15. At least one computer-readable medium having computer-executable instructions, which when executed perform steps, comprising:
 presenting icons corresponding to a plurality of input methods available for a computer application, wherein each input method is a computer-executable software component distinct from the computer application;
 invoking a selected input method in response to a user selecting an icon corresponding to the selected input method, including presenting an input panel window; and
 accepting user data entered in the input panel window for the computer application, wherein the user data is provided to the computer application as if the user data was received from a hardware input device.

16. The computer-readable medium of claim 15 wherein accepting user data includes detecting user interaction with a touch-sensitive display.

17. The computer-readable medium of claim 15 wherein each input method comprises a component object model (COM) object, and wherein the step of invoking the selected input method includes the step of instantiating the COM object.

18. The computer-readable medium of claim 15 further comprising converting the user data to a Unicode character value.

19. In a computing environment, a system comprising,
 a manager component stored on one or more computer-readable media and configured:
  to manage selection of a selected input method from one or more available stored input methods, wherein each input method is a computer-executable software component distinct from one or more computer programs, and
  to send input data corresponding to a user input received at the selected input method to a graphical windowing environment; and
 the graphical windowing environment to receive the input data and to send the input data to a computer program of the one or more computer programs, wherein the input data is sent to the computer program as if the input data was received via user input received from a hardware input device.

20. The system of claim 19 wherein the computer program comprises an application program having focus.

21. The system of claim 19 further comprising an input panel window corresponding to the selected input method.

22. The system of claim 21 wherein the selected input method presents an image representing a keyboard on the input panel window.

23. The system of claim 21 wherein the manager component selectively displays and hides the input panel window.

24. The system of claim 21 wherein interaction with the input panel does not cause the input panel window to receive focus.

25. The system of claim 19 where the input method is displayed on a touch-sensitive display screen.

26. The system of claim 19 wherein the manager component transfers information from the computer program to the selected input method.

27. The system of claim 19 wherein the selected input method calls functions in the manager component via a defined interface set.

28. The system of claim 19 wherein the selected input method comprises an object.

29. The system of claim 19 wherein the selected input method draws an input panel in an input panel window displayed in the graphical windowing environment.

30. The system of claim 29 wherein the manager component selectively displays and hides the display of the input panel window.

31. The system of claim 29 wherein the manager component docks the input panel window.

* * * * *

UNITED STATES PATENT AND TRADEMARK OFFICE
CERTIFICATE OF CORRECTION

| | | |
|---|---|---|
| PATENT NO. | : 7,411,582 B2 | Page 1 of 1 |
| APPLICATION NO. | : 10/989877 | |
| DATED | : August 12, 2008 | |
| INVENTOR(S) | : Michael G. Toepke et al. | |

It is certified that error appears in the above-identified patent and that said Letters Patent is hereby corrected as shown below:

In Title page, in Item (63), under "Related U.S. Application Data" column 1, line 2, delete "6,819,315." and insert -- 6,819,315, which is a continuation of U.S. patent application Ser. No. 08/991,277 filed Dec. 16, 1997. --, therefor.

Signed and Sealed this

Nineteenth Day of April, 2011

David J. Kappos
*Director of the United States Patent and Trademark Office*

INTER PARTES REEXAMINATION CERTIFICATE (1186th)
United States Patent
Toepke et al.

(10) Number: US 7,411,582 C1
(45) Certificate Issued: *Oct. 8, 2015

(54) SOFT INPUT PANEL SYSTEM AND METHOD

(75) Inventors: Michael G. Toepke, Bellevue, WA (US); Jeffrey R. Blum, Seattle, WA (US); Kathryn L. Parker, Fall City, WA (US)

(73) Assignee: Microsoft Technology Licensing, LLC

Reexamination Request:
No. 95/002,342, Sep. 14, 2012

Reexamination Certificate for:
Patent No.: 7,411,582
Issued: Aug. 12, 2008
Appl. No.: 10/989,877
Filed: Nov. 15, 2004

Certificate of Correction issued Apr. 19, 2011

( * ) Notice: This patent is subject to a terminal disclaimer.

Related U.S. Application Data

(63) Continuation of application No. 10/072,111, filed on Feb. 8, 2002, now Pat. No. 6,819,315, which is a continuation of application No. 08/991,277, filed on Dec. 16, 1997, now abandoned.

(51) Int. Cl.
*G06F 3/041* (2006.01)
*G06F 3/023* (2006.01)
*G06F 3/0488* (2013.01)

(52) U.S. Cl.
CPC .......... *G06F 3/04886* (2013.01); *G06F 3/0238* (2013.01)

(58) Field of Classification Search
None
See application file for complete search history.

(56) References Cited

To view the complete listing of prior art documents cited during the proceeding for Reexamination Control Number 95/002,342, please refer to the USPTO's public Patent Application Information Retrieval (PAIR) system under the Display References tab.

*Primary Examiner* — Simon Ke

(57) ABSTRACT

A method and system for receiving user input data into a computer system having a graphical windowing environment. A touch-sensitive display screen for displaying images and detecting user activity is provided. A management component connects to the graphical windowing environment to create an input panel window for display on the screen. An input method which may be a COM object is selected from multiple input methods available, and installed such that the input method can call functions of the management component. Each input method includes a corresponding input panel, such as a keyboard, which it draws in the input panel window. When the user taps the screen at the input panel, the input method calls a function of the management component to pass corresponding input information appropriate information such as a keystroke or character to the management component. In response, the management component communicates the user data to the graphical windowing environment as a message, whereby an application program receives the message as if the message was generated on a hardware input device.

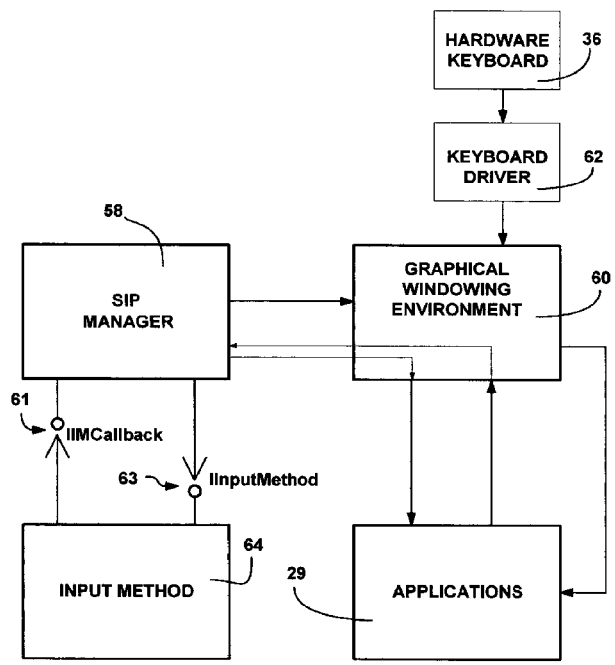

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-8, 10, 11, 13, 15, 16 and 18-30 are cancelled.

Claims 9, 12, 14, 17 and 31 were not reexamined.

\* \* \* \* \*